United States Patent Office 3,764,493
Patented Oct. 9, 1973

3,764,493
RECOVERY OF NICKEL AND COBALT
Larry J. Nicks, Henderson, and Kenneth P. V. Lei and Thomas A. Sullivan, Boulder City, Nev., assignors to the United States of America as represented by the Secretary of the Interior
Filed Aug. 31, 1972, Ser. No. 285,263
Int. Cl. B01k 3/00; C22d 3/00
U.S. Cl. 204—64 R
4 Claims

ABSTRACT OF THE DISCLOSURE

Nickel and cobalt are separated and recovered from ores or alloy scrap by selective cathodic reduction and deposition of nickel in a galvanic cell. The galvanic cell employs separate cathode and anode sections, a nickel cathode, a cobalt anode and a fused salt electrolyte. The catholyte and anolyte compartments of the cell are connected by means of a porous diaphragm, while the cathode and anode are directly electrically connected externally.

---

Figure 1:
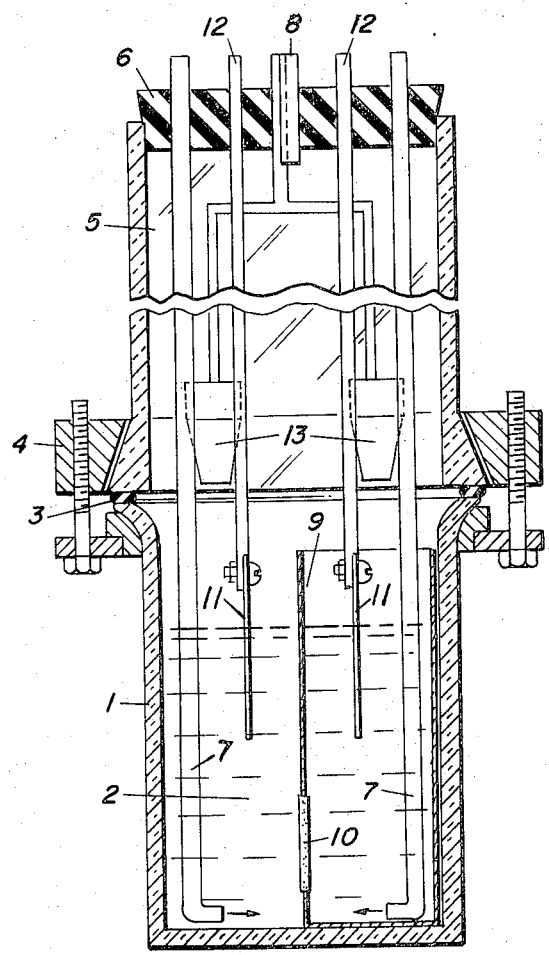

Large quantities of heat and corrosion resistant alloys, which consist predominantly of nickel and cobalt in widely varying ratios, are used in the defense and aerospace industries. Since much of the nickel and cobalt used in the United States comes from foreign sources, an efficient means for recovering the metals from scrap for recycling is highly desirable. In addtion, nickel and cobalt are usually found together in lateritic ores and improved processes for recovering the metals from ore are also needed. In either case, one of the main problems is that of obtaining an effective separation of the two metals.

Various processes have previously been employed for separation and recovery of nickel and cobalt. These include chemical separation in aqueous solution, electrolytic separation in aqueous solution, extraction processes and the Mond process. These methods, however, suffer from various disadvantages. E.g., chemical separation processes, which are usually selective precipitation processes, require close control of pH, temperature and concentration. In addition, the resulting compounds must be further processed to produce metals, and the precipitating reagents result in formation of byproducts or the necessity of additional recycling processes. Electrolytic methods do not give effective separation of the metals unless the concentration ratio of the two metals in solution is very large, due to the nearly identical reduction potentials of nickel and cobalt in aqueous solution.

Extraction processes, i.e., processes in which an organic solvent, an ion exchange resin or an inorganic absorbent are used to remove one of the metals from solution, generally have the same disadvantages as chemical separations. In addition, extraction media is usually expensive and additional equipment is required for extraction, stripping and extractant recycling. The Mond process, which is based on the volatility of nickel tetracarbonyl, is restricted to nickel purification in which the impure metal contains only small amounts of cobalt.

Fused salt electrolysis, as described in U.S. Bureau of Mines Report of Investigations 7082, has been used for separating nickel and cobalt. However, this process is effective only where the proportions of cobalt are small (up to 5 percent), i.e., where the process is essentially one of nickel purification. Furthermore, the electrolytic process does not lend itself to recovery of high purity cobalt.

It has now been found, according to the process of the invention, that the above disadvantages of the prior art processes may be largely overcome by cathodic reduction of nickel in a galvanic cell employing a nickel cathode, a cobalt anode and a fused salt electrolyte. In addition, the cell employs separate cathode and anode sections that are connected by means of a porous diaphragm.

The process of the invention involves selective reduction of nickel from a mixture of nickel and cobalt halides in a fused salt electrolyte. The reaction consists essentially of the reduction of nickel halide by cobalt metal:

$$Ni(X)_2 + Co \rightarrow Ni + Co(X)_2$$

where X is halide.

Although a direct reduction of a fused halide mixture with cobalt metal will result in a quantitative removal of nickel from the melt, the metallic nickel is deposited on the surface of the cobalt, making further separation necessary. To overcome this problem, the invention makes use of a diaphragm type galvanic cell in which the oxidation and reduction half reactions are separated. In one compartment of the cell, the cobalt anode is immersed in a fused alkali halide barren of nickel. On the other side of the diaphragm, a nickel cathode is immersed in the fused salt containing nickel and cobalt ions. When the two electrodes are electrically connected, the reaction proceeds with nickel being deposited at the cathode as the cobalt anode is oxidized and passes into solution. The resulting cobalt solution, practically free of nickel, can then be reduced to recover the cobalt.

FIG. 1 of the drawings illustrates diagrammatically a specific embodiment of an apparatus suitable for use in the process of the invention. Many possible modifications of this apparatus, within the scope of the invention, will, however, be apparent to those skilled in the art.

Referring to FIG. 1, a porcelain beaker 1, 8 inches tall and 4 inches in diameter, contains fused salt electrolyte 2. The beaker is sealed with a silicone rubber gasket 3 and flange clamp 4 to a section of 4-inch O.D. Pyrex pipe 5, 13 inches long and capped with rubber stopper 6.

The electrolyte is stirred by bubbling helium or argon through the fused mixture by means of Pyrex capillary tubes 7, with the excess gas passing out of the cell through outlet 8.

Electrolyte partition 9 is a semicylinder with closed bottom, and is formed of .028-inch thick molybdenum sheet. A 2-inch diameter hole in the flat face of the semicylinder is covered with a porous diaphragm 10 consisting of a 20 mesh molybdenum screen coated with a .040 inch thick layer of high-alumina cement.

Electrodes 11 consist of 1-inch by 3-inch plates, 1/16 inch in thickness, of nickel and cobalt, respectively. Each is immersed about 1½ inches into the electrolyte. The electrodes are bolted to stainless steel rods 12 which serve as leads for connecting anode and cathode. The apparatus is also fitted wtih two molybdenum cups 13 which are used to sample the electrolyte.

The feed material in the process of the invention consists of a mixture of nickel and cobalt halides. Hence, the invention is applicable to separation and recovery of nickel and cobalt from any mixture of the metals, or their compounds, that can be converted to halides. As discussed above, such mixtures will commonly consist of alloy scrap, or of ores containing the two metals, or mixtures of compounds derived from alloy and ore-treating processes such as leaching. Such mixtures of the metals or compounds are usually readily converted to mixtures of the halides by conventional processes such as roasting in the presence of halogen. E.g., scrap metal containing nickel and cobalt may be converted to a mixture of the chlorides by reacting the scrap, preferably finely divided, with chlorine gas at a temperature of about 800° C., one of the chlorination product fractions being a mixture of nickel and cobalt chlorides.

The electrolyte, employed in both the cathode and anode sections of the galvanic cell in the process of the invention, consists of molten alkali or alkaline earth halides or mixtures thereof. Suitable halides include LiCl, KCl, CaCl$_2$, MgCl$_2$, NaBr, KBr, CaBr$_2$, MgBr$_2$, and LiBr. Eutectic mixtures of alkali or alkaline earth halides have been found to be particularly effective. These include a LiCl-KCl eutectic, consisting of 44% LiCl and 56% KCl, and a CaCl$_2$-NaCl-KCl eutectic, consisting of 65% CaCl$_2$, 29% NaCl and 6% KCl.

The operating temperature of the process of the invention will, of course, be at least as high as the temperature required to maintain the electrolyte containing the nickel and cobalt-containing feed material in the molten state. Higher temperatures may sometimes be desired in order to increase reaction rates and insure removal of all water from the salt. Maximum temperature will generally be limited by cost, and by the difficulty of obtaining suitable refractory materials for cell construction. Practical operating temperatures may range from about 250 to 750° C., with a temperature of about 450° C. being preferred when using the LiCl-KCl eutectic mixture, and a temperature of about 525° C. preferred for the CaCl$_2$-NaCl-KCl eutectic. Atmospheric pressure is usually satisfactory, but pressures of about 0.1 to 10 atm. may be used.

The electrolyte in the cathode and anode sections of the cell will normally consist of the same molten salt mixture. However, only the cathode section will contain the feed material, i.e., the mixture of nickel and cobalt halides. Initial concentration ranges of nickel and cobalt in the cathode section are quite variable, depending on the size of the cell, size and shape of the electrodes, etc. Since cobalt is used as the reducing agent, only nickel is reduced, regardless of the nickel-to-cobalt ratio, until the equilibrium ratio is reached. This ratio will depend on the difference in reduction potentials of the metals in the particular electrolyte and will usually range from a ratio of about 1:300 to 1:500. Generally, the concentrations of nickel and/or cobalt may range from about 0.1% to 20%, or even higher as long as phase separation does not occur. The ratio of nickel concentration-to-cobalt concentration is not critical and the feed material may contain the two metals in substantially all proportions. Introduction of the feed material into the electrolyte may be by dissolution in the molten salt, or by addition to the electrolyte salt, or mixture of salts, prior to heating to the molten state.

Separation of the cathode and anode sections of the cell is achieved by means of a porous diaphragm. The size, shape, mechanical characteristics, and composition of the diaphragm may vary widely, provided it serves to limit the diffusion of nickel ions to a rate less than the rate of nickel reduction at the cathode, while permitting an acceptable reaction rate. The diaphragm must, therefore, be sufficiently permeable to allow diffusion of charge carriers present in high concentration, e.g., sodium or lithium ions, so that a large imbalance of charge does not result, but not so permeable as to allow nickel ions to pass into the anolyte before they can be reduced at the cathode. For this purpose, a diaphragm having a thickness of about .020 to .080 inch, a pore size of about 5 to 30 microns and a porosity of about 20 to 50 percent is preferred. The diaphragm may consist of alumina, porous carbon, graphite sheet, asbestos, fritted glass, or fabric or felt made from refractory fibers such as quartz, etc.

A diaphragm comprising a layer of high-alumina cement, as employed in the example below, is a preferred embodiment. This high-alumina cement consists mainly of calcium aluminates and is conventionally made by fusing a mixture of limestone and bauxite, with small amounts of silica and titania, at a temperature of about 1425-1500° C. It is applied to a support material, such as the molybdenum screen of the example, in the form of an aqueous slurry of a concentration sufficient to form a fairly thick slurry, usually about 50 to 90 percent by weight of cement, followed by drying.

The exact structure and means for supporting the diaphragm in the cell are not critical and many arrangements will be apparent to those skilled in the art. The mechanical means illustrated in FIG. 1 has been found to be effective both from the standpoint of efficiency of the cell reaction and convenience and stability of the cell structure. In this arrangement, the electrolyte partition consists of a sheet-metal container in the form of a semi-cylinder with closed bottom, and with a hole in the flat face of the semi-cylinder. This hole is covered with the porous diaphragm. In the preferred embodiment of the invention, disclosed in the examples below, the diaphragm was prepared by covering the hole with a 20 mesh molybdenum screen, and then painting the screen with an 85 percent aqueous slurry of high-alumina cement, followed by drying at room temperature. Sufficient alumina slurry was applied to provide a coating of alumina, when dry, of about .040 inch thickness and having a pore size of about 20 microns.

The cathode and anode of the cell employed in the process of the invention consist essentially of nickel and cobalt, respectively. Since the objective of the process is to obtain the two metals in a state of purity sufficient for reuse in preparation of alloys, etc., the electrodes will ordinarily consist largely of the pure metals, although small amounts of impurities may not be objectionable, depending on the intended use. Size and shape of the electrodes may vary greatly, depending on the size and type of cell employed, concentration of nickel and cobalt, etc.

Nickel contained in the feed material is essentially completely recovered by direct deposition on the cathode. Following deposition, the cathode is removed from the cell and leached with 1% HCl in water to remove salts or other impurities. The nickel is then removed by scraping the deposit from cathode. The metal ions, other than those of the electrolyte, remaining in both the catholyte and anolyte will consist essentially of cobalt and this metal is readily recovered by electrodeposition, or other conventional means, from the same electrolyte mixture. Part of the cobalt will usually be recycled for reduction of additional nickel and the excess is recovered as product.

Figure 2:
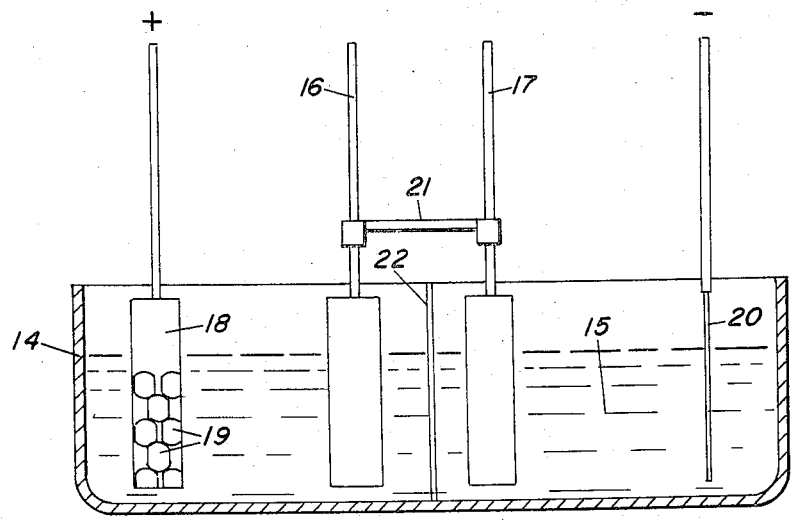

An alternative embodiment of the process of the invention may be employed to convert nickel-cobalt alloy scrap to nickel and cobalt halides, and to simultaneously separate the two metals. In this embodiment, the apparatus shown diagrammatically in FIG. 2 is employed. In this apparatus, fused silica liner 14 contains molten salt electrolyte 15, galvanic cobalt anode 17, electrolyte anode basket 18 containing scrap Ni-Co alloy 19, cobalt electrolytic cathode 20, bus bar 21 and porous diaphragm 22. In operation, the alloy scrap is electrolytically dissolved into the fused salt electrolyte. The two central electrodes, i.e., the galvanic electrodes, are identical in function to those of the previously described cell of FIG. 1. That is, the nickel is deposited from solution onto the galvanic nickel cathode while the galvanic cobalt anode dissolves. This leaves only cobalt in solution on the right side of the cell, which is reduced electrolytically at the cobalt cathode.

The following example will serve to more particularly illustrate the invention.

EXAMPLE

The apparatus employed was that of FIG. 1. 500 grams of LiCl-KCl eutectic was used in each section, i.e., cathode and anode sections, of the cell. The catholyte additionally contained 1.0 percent each of dissolved Ni and Co, in the form of chloride, and the anolyte contained 1.0 percent dissolved cobalt, also as chloride. Temperature of the cell contents was held at 450° C. and the reaction was carried out for a period of 18 hours. After completion of the reaction, the concentration of nickel in the catholyte was 0.002 percent, a change in the Ni:Co ratio from the original 1:1 to about 1:450. The cathodic deposit was analyzed and found to be 99.2 percent nickel.

We claim:

1. A process for separation and recovery of nickel and cobalt comprising providing a galvanic cell comprising (1) a cathode section consisting essentially of molten salt electrolyte, nickel and cobalt halides dissolved in said electrolyte, and a nickel cathode, (2) an anode section comprising molten salt electrolyte and a cobalt anode and (3) a porous diaphragm separating the cathode and anode sections, and operating said cell for a time sufficient to effect substantially complete selective reduction of the dissolved nickel and deposition of said nickel onto the cathode.

2. The process of claim 1 in which the molten salt electrolyte consists of a 44% LiCl-56% KCl eutectic mixture.

3. The process of claim 1 in which the molten salt electrolyte consists of a 65% $CaCl_2$-29% NaCl-6% KCl eutectic mixture.

4. The process of claim 1 in which the nickel and cobalt halides are chlorides.

References Cited

UNITED STATES PATENTS

| | | | |
|---|---|---|---|
| 2,724,688 | 11/1955 | Gruner | 204—248 X |
| 3,188,282 | 6/1965 | Freedman | 204—64 R |
| 3,232,853 | 2/1966 | Cook | 204—39 |

JOHN H. MACK, Primary Examiner

D. R. VALENTINE, Assistant Examiner

U.S. Cl. X.R.

204—248